United States Patent
Fujiwara et al.

(10) Patent No.: US 9,614,249 B2
(45) Date of Patent: Apr. 4, 2017

(54) SEPARATOR FOR NON-AQUEOUS ELECTROLYTE SECONDARY BATTERY AND NON-AQUEOUS ELECTROLYTE SECONDARY BATTERY

(71) Applicant: Panasonic Intellectual Property Management Co., Ltd., Osaka (JP)

(72) Inventors: Isao Fujiwara, Osaka (JP); Nobuhiro Hirano, Osaka (JP); Masaru Watanabe, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 33 days.

(21) Appl. No.: 14/516,903

(22) Filed: Oct. 17, 2014

(65) Prior Publication Data
US 2015/0118540 A1 Apr. 30, 2015

(30) Foreign Application Priority Data

Oct. 29, 2013 (JP) ................................ 2013-223907

(51) Int. Cl.
H01M 2/16 (2006.01)
H01M 10/05 (2010.01)
H01M 10/052 (2010.01)

(52) U.S. Cl.
CPC ........... *H01M 10/05* (2013.01); *H01M 2/162* (2013.01); *H01M 2/1626* (2013.01); *H01M 2/1653* (2013.01); *H01M 2/1686* (2013.01); *H01M 10/052* (2013.01)

(58) Field of Classification Search
CPC ... H01M 2/1686; H01M 2/1653; H01M 2/162
See application file for complete search history.

(56) References Cited

U.S. PATENT DOCUMENTS

| | | | | |
|---|---|---|---|---|
| 2008/0113259 | A1* | 5/2008 | Brilmyer | H01M 2/1666 429/50 |
| 2009/0155678 | A1* | 6/2009 | Less | H01M 2/1673 429/144 |
| 2012/0107656 | A1* | 5/2012 | Tanizaki | H01M 2/1653 429/94 |

FOREIGN PATENT DOCUMENTS

| | | |
|---|---|---|
| JP | 2004-214066 | 7/2004 |
| JP | 2007-005158 | 1/2007 |
| JP | 4350953 | 10/2009 |

* cited by examiner

*Primary Examiner* — Stewart Fraser
*Assistant Examiner* — Olatunji Godo
(74) *Attorney, Agent, or Firm* — McDermott Will & Emery LLP (57) ABSTRACT

A separator according to the present disclosure is a separator for a non-aqueous electrolyte secondary battery that includes a porous layer that contains cellulose fibers and resin particles. The ratio of the amount of the resin particles to the total amount of the cellulose fibers and the resin particles increases with decreasing distance from one surface of the porous layer.

20 Claims, 2 Drawing Sheets

SEPARATOR FOR NON-AQUEOUS ELECTROLYTE SECONDARY BATTERY AND NON-AQUEOUS ELECTROLYTE SECONDARY BATTERY

BACKGROUND

1. Technical Field

The present disclosure relates to a separator for a non-aqueous electrolyte secondary battery and a non-aqueous electrolyte secondary battery.

2. Description of the Related Art

Japanese Unexamined Patent No. 4350953 discloses a separator for a lithium secondary battery that is formed of a non-woven fabric that contains pulp-like heat-resistant fibers and a pulp-like or particulate hot-melt resin material. According to Japanese Unexamined Patent No. 4350953, the hot-melt resin material, which is a pulp-like or particulate material, can be uniformly dispersed in the non-woven fabric and reliably perform a shutdown function when melting occurs.

Japanese Unexamined Patent Application Publication No. 2007-5158 discloses a separator for a lithium-ion secondary battery composed of at least three layers including an A layer and a B layer alternately stacked on top of one another. The A layer is formed of organic solid particles combined with a binder. The B layer is formed of inorganic solid particles combined with a binder.

However, these known separators for a non-aqueous electrolyte secondary battery cannot sufficiently prevent an internal short circuit while maintaining high gas permeability and do not have a satisfactory shutdown function.

SUMMARY

A separator for a non-aqueous electrolyte secondary battery according to the present disclosure includes a porous layer mainly composed of cellulose fibers. The porous layer contains resin particles. The ratio of the amount of the resin particles to the total amount of the cellulose fibers and the resin particles increases with decreasing distance from one surface of the porous layer.

The present disclosure can provide a separator for a non-aqueous electrolyte secondary battery that can sufficiently prevent an internal short circuit while maintaining high gas permeability and that has a satisfactory shutdown function.

DETAILED DESCRIPTION

Finding that Underlies the Present Disclosure

Separators should sufficiently prevent an internal short circuit while maintaining high gas permeability (or liquid permeability). For example, the separator according to Japanese Unexamined Patent No. 4350953 requires a large amount of hot-melt resin particles uniformly dispersed not only in the surface layer but also in the thickness direction in order to block the pores between skeletal fibers for shutdown. This may result in low film strength due to a reduction in the proportion of the skeletal fibers. The stacked resin particles also result in increased pore diameters and a higher occurrence of a short circuit caused by a lithium dendrite.

In the separator according to Japanese Unexamined Patent Application Publication No. 2007-5158, the porous film composed of combined particles has low strength. Thus, this separator has the same problems as the separator described in Japanese Unexamined Patent No. 4350953.

The present inventors found that localization of resin particles on a layer surface side of a porous layer mainly composed of cellulose fibers can achieve satisfactory shutdown characteristics with a small amount of resin. The proportion of the cellulose fibers increases with the distance from the layer surface, and therefore the separator can have high strength.

On the basis of the finding, the present inventors arrived at the following aspects of the present invention.

A separator for a non-aqueous electrolyte secondary battery according to a first aspect of the present disclosure is a separator for a non-aqueous electrolyte secondary battery that includes a porous layer that contains cellulose fibers and resin particles, wherein the ratio of the amount of the resin particles to the total amount of the cellulose fibers and the resin particles increases with decreasing distance from one surface of the porous layer.

In accordance with the first aspect, the resin particles are localized at one surface of the porous layer and the vicinity thereof and are not uniformly dispersed. Because of the localization of the resin particles, satisfactory shutdown characteristics can be achieved with a small amount of resin. Thus, the present disclosure can provide a separator for a non-aqueous electrolyte secondary battery that can sufficiently prevent an internal short circuit while maintaining high gas permeability and has a satisfactory shutdown function.

In accordance with a second aspect, in the separator for a non-aqueous electrolyte secondary battery according to the first aspect, the ratio of the occupied area of the resin particles to the total occupied area of the cellulose fibers and the resin particles in a vertical cross section of the porous layer at a depth of 1 μm or less from the one surface may be 90% or more.

The separator for a non-aqueous electrolyte secondary battery according to the second aspect has a satisfactory shutdown function.

In accordance with a third aspect, in the separator for a non-aqueous electrolyte secondary battery according to the second aspect, the ratio of the occupied area of the resin particles to the total occupied area of the cellulose fibers and the resin particles in a vertical cross section of the porous layer at a depth in the range of 2 to 5 μm from the one surface may range from 30% to 50%.

In accordance with the third aspect, the resin particles in the porous layer are distributed to a certain depth as well as on the outermost surface. Since the resin particles attract each other by the action of interparticle cohesive force, the resin particles combine with each other not only on a first surface but also in the thickness direction. Although a particle layer formed only on a surface of the porous layer detaches easily from the porous layer, a layer of the resin particles disposed on the surface of the porous layer according to the third aspect rarely detaches from the porous layer.

In accordance with a fourth aspect, the resin particles in the separator for a non-aqueous electrolyte secondary battery according to any one of the first to third aspects may have properties of melting at a temperature in the range of 90° C. to 200° C.

The separator for a non-aqueous electrolyte secondary battery according to the fourth aspect has a satisfactory shutdown function.

In accordance with a fifth aspect, the separator for a non-aqueous electrolyte secondary battery according to any one of the first to fourth aspects may further include a non-woven fabric base material contains thermoplastic fibers, wherein the porous layer may be disposed on the non-woven fabric base material.

In accordance with the fifth aspect, the non-woven fabric base material can strengthen the separator.

In accordance with a sixth aspect, the non-woven fabric base material of a separator for a non-aqueous electrolyte secondary battery according to the fifth aspect may include a mixed portion of the thermoplastic fibers and the cellulose fibers at an interface between the non-woven fabric base material and the porous layer.

In accordance with the sixth aspect, the mixed portion strongly combines the thermoplastic fibers with the cellulose fibers. This can increase the interfacial strength between the non-woven fabric base material and the porous layer.

In accordance with a seventh aspect, the cellulose fibers of the separator for a non-aqueous electrolyte secondary battery according to any one of the first to sixth aspects may have an average fiber diameter of 0.05 µm or less.

The seventh aspect can provide small pore sizes.

In accordance with an eighth aspect, the separator for a non-aqueous electrolyte secondary battery according to any one of the first to seventh aspects may have a maximum pore diameter of 0.2 µm or less as measured with a Perm-Porometer.

The separator according to the eighth aspect can have higher mechanical strength, denseness, and tortuosity than separators having a maximum pore diameter of more than 0.2 µm and is less likely to develop an internal short circuit caused by a lithium dendrite.

A non-aqueous electrolyte secondary battery according to a ninth aspect may include
a positive electrode,
a negative electrode,
the separator for a non-aqueous electrolyte secondary battery according to any one of the first to eighth aspects disposed between the positive electrode and the negative electrode, and
a non-aqueous electrolyte.

The non-aqueous electrolyte secondary battery according to the ninth aspect can sufficiently prevent an internal short circuit while maintaining high gas permeability and has a satisfactory shutdown function.

Embodiments of the present disclosure will be described in detail below with reference to the accompanying drawings. These embodiments are given for illustration and are not intended to limit the present disclosure. The drawings referred to in the embodiments are schematic representations.

Figure 1:
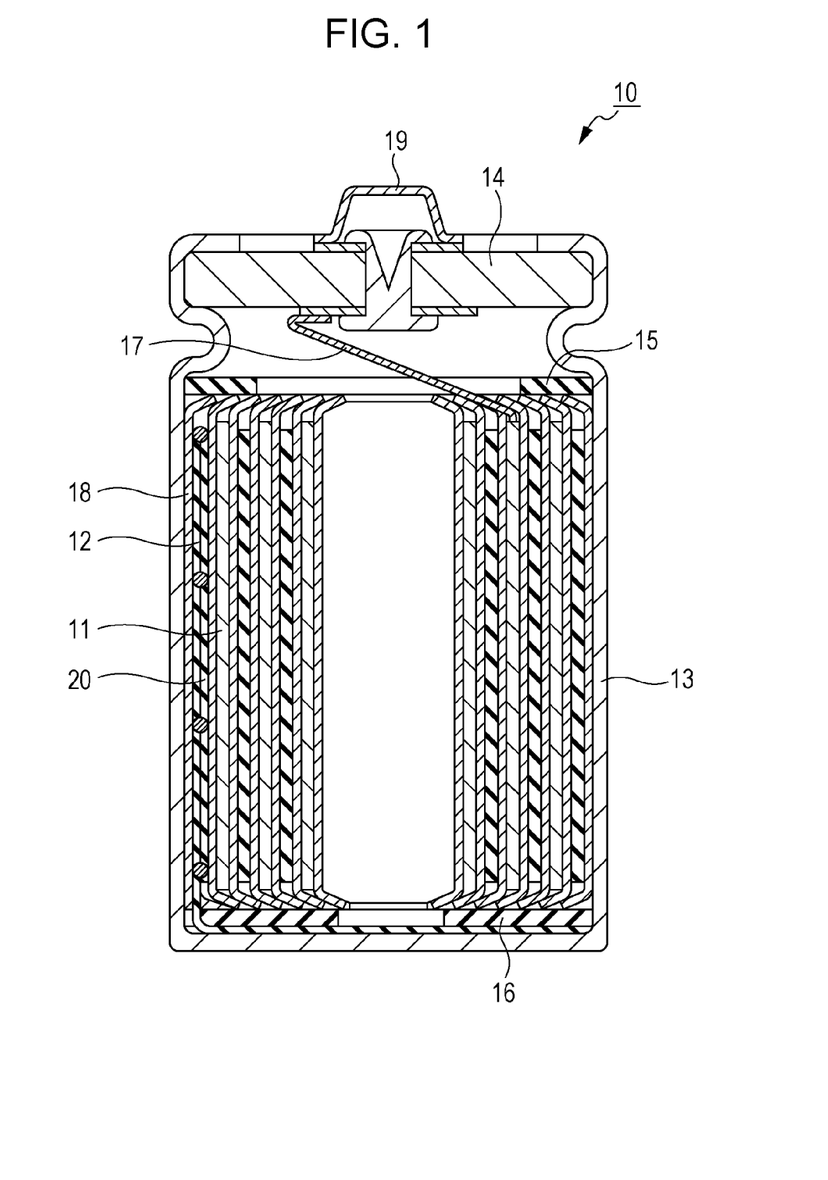
FIG. 1 is a cross-sectional view of a non-aqueous electrolyte secondary battery according to an embodiment of the present disclosure.

FIG. 1 is a cross-sectional view of a non-aqueous electrolyte secondary battery 10 according to an embodiment of the present disclosure.

The non-aqueous electrolyte secondary battery 10 includes a positive electrode 11, a negative electrode 12, a separator 20 for a non-aqueous electrolyte secondary battery (hereinafter referred to simply as a "separator 20") disposed between the positive electrode 11 and the negative electrode 12, and a non-aqueous electrolyte (not shown). The positive electrode 11 and the negative electrode 12 are wound with the separator 20 interposed therebetween and, together with the separator 20, form a wound electrode assembly. The non-aqueous electrolyte secondary battery 10 includes a cylindrical type battery case 13 and a sealing plate 14. The wound electrode assembly and the non-aqueous electrolyte are contained in the battery case 13. An upper insulator 15 and a lower insulator 16 are disposed at opposite ends of the wound electrode assembly in the longitudinal direction. The positive electrode 11 is connected to one end of a positive-electrode lead 17. The other end of the positive-electrode lead 17 is connected to a positive electrode terminal 19 on the sealing plate 14. The negative electrode 12 is connected to one end of a negative-electrode lead 18. The other end of the negative-electrode lead 18 is connected to an inner bottom of the battery case 13. The sealing plate 14 is attached to an open end of the battery case 13 by caulking and thereby seals the battery case 13.

Although FIG. 1 illustrates a cylindrical battery including a wound electrode assembly, the present disclosure is not limited to this. The battery may be of any shape and may be a rectangular battery, a flat battery, a coin battery, or a laminate film pack battery.

The positive electrode 11 contains a positive-electrode active material, such as a lithium-containing composite oxide. Examples of the lithium-containing composite oxide include lithium cobalt oxide, modified substances of lithium cobalt oxide, lithium nickel oxide, modified substances of lithium nickel oxide, lithium manganate, and modified substances of lithium manganate. The modified substances of lithium cobalt oxide contain nickel, aluminum, and/or magnesium, for example. The modified substances of lithium nickel oxide contains cobalt and/or manganese, for example.

The positive electrode 11 contains a positive-electrode active material as an essential component and a binder and an electroconductive material as optional components. Examples of the binder include polyvinylidene fluoride (PVDF), modified substances of PVDF, polytetrafluoroethylene (PTFE), and modified polyacrylonitrile rubber particles. PTFE and rubber particles are preferably used in combination with a thickener, such as carboxymethyl cellulose (CMC), polyethylene oxide (PEO), or a soluble modified polyacrylonitrile rubber. Examples of the electroconductive material include acetylene black, ketjen black, and various types of graphite.

The negative electrode 12 contains a negative-electrode active material, for example, a carbon material, such as graphite, a silicon-containing material, a tin-containing material, or a lithium alloy. Examples of the graphite include natural graphite and artificial graphite. The lithium alloy may contain metallic lithium, tin, aluminum, zinc, and magnesium.

The negative electrode 12 contains a negative-electrode active material as an essential component and a binder and an electroconductive material as optional components. Examples of the binder include PVDF, modified substances of PVDF, styrene-butadiene copolymers (SBR), and modified substances of SBR. In particular, SBR and modified substances of SBR are preferred in terms of chemical stability. SBR and modified substances of SBR are preferably used in combination with CMC, which has a thickening effect.

The separator 20 is disposed between the positive electrode 11 and the negative electrode 12 and is permeable to Li ions while preventing a short circuit between the positive electrode 11 and the negative electrode 12. The separator 20 is a porous film that has many pores through which Li ions pass during the charge/discharge of the non-aqueous electrolyte secondary battery 10. As described in detail below, the separator 20 is a porous film that is composed of thermoplastic fibers 24, cellulose fibers 25, and resin particles 26. The separator 20 may include a porous layer mainly composed of heat-resistant fine particles, such as iron oxide, $SiO_2$ (silica), $Al_2O_3$ (alumina), or $TiO_2$ fine particles, on or in the porous film.

The non-aqueous electrolyte is preferably, but not limited to, a non-aqueous solvent in which a lithium salt is dissolved. Examples of the lithium salt include $LiPF_6$ and $LiBF_4$. Examples of the non-aqueous solvent include ethylene carbonate (EC), propylene carbonate (PC), dimethyl carbonate (DMC), diethyl carbonate (DEC), and ethyl methyl carbonate (EMC). These non-aqueous solvents are preferably used in combination.

Figure 2:
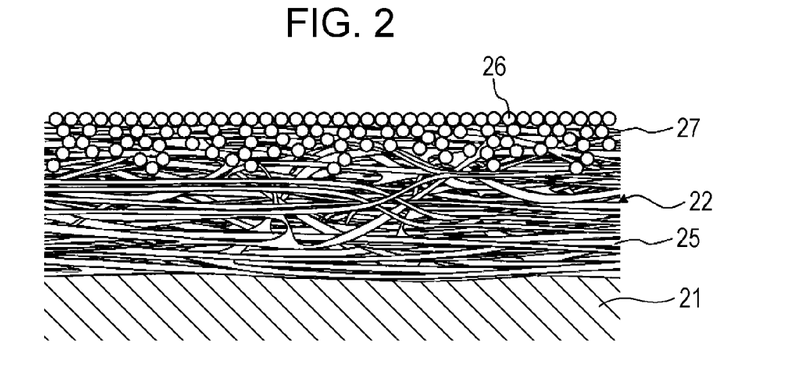
FIG. 2 is a cross-sectional view of a separator for a non-aqueous electrolyte secondary battery according to an embodiment of the present disclosure.
Figure 3:
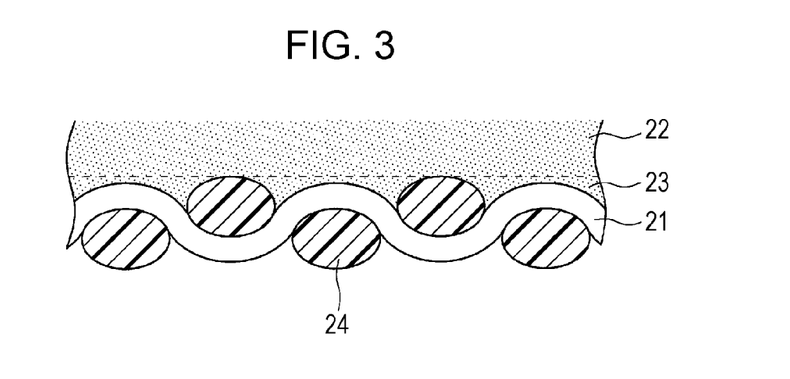
FIG. 3 is an enlarged view of the vicinity of the interface between a non-woven fabric base material and a cellulose fiber layer in the separator illustrated in FIG. 2.

FIGS. 2 and 3 are cross-sectional views of the separator 20 according to an embodiment of the present disclosure.

The separator 20 includes a porous layer 22 mainly composed of the cellulose fibers 25. The porous layer 22 contains the resin particles 26. The ratio of the amount of the resin particles 26 to the total amount of the cellulose fibers 25 and the resin particles 26 increases with decreasing distance from one surface of the porous layer 22. In other words, the porous layer 22 is a cellulose fiber layer containing the resin particles 26 and includes a particle mixed portion 27 in which the cellulose fibers 25 and the resin particles 26 coexist. The resin particles 26 are not uniformly distributed in the porous layer 22 and are localized on one surface side of the porous layer 22, as described in detail below.

Although the separator 20 may be formed of the porous layer 22 alone, the separator 20 preferably further includes a non-woven fabric base material 21 mainly composed of the thermoplastic fibers 24. The separator 20 can be a porous film that includes the porous layer 22 on the non-woven fabric base material 21. The non-woven fabric base material 21 can strengthen the separator 20. The non-woven fabric base material 21 includes a mixed portion 23 at the interface between the non-woven fabric base material 21 and the porous layer 22. The mixed portion 23 includes the thermoplastic fibers 24 and the cellulose fibers 25.

[Non-Woven Fabric Base Material 21]

The non-woven fabric base material 21 is mainly composed of the thermoplastic fibers 24. Like the porous layer 22, the non-woven fabric base material 21 is also a porous layer. The non-woven fabric base material 21 preferably has a larger pore diameter than the porous layer 22.

The phrase "mainly composed of the thermoplastic fibers 24", as used herein, means that the amount of the thermoplastic fibers 24 is more than 50% by mass of the total mass of the non-woven fabric base material 21. The non-woven fabric base material 21 may contain fibers other than the thermoplastic fibers 24, provided that the thermoplastic fibers 24 constitute more than 50% by mass of the non-woven fabric base material 21. As a matter of course, the non-woven fabric base material 21 may be composed of the thermoplastic fibers 24 alone. In addition to the thermoplastic fibers 24, the non-woven fabric base material 21 may contain a sizing agent, a wax, inorganic fillers, organic fillers, a colored material, a stabilizing agent (such as an antioxidant, a heat stabilizer, and/or an ultraviolet absorber), a plasticizing agent, an antistatic agent, and/or a flame retardant.

The non-woven fabric base material 21 can be manufactured using a conventionally known manufacturing method, for example, by wet or dry papermaking using the thermoplastic fibers 24. Preferably, non-woven fabrics manufactured by dry papermaking, such as a spunbond process, a thermobond process, or a melt flow process, are used. The non-woven fabric base material 21 manufactured by dry papermaking has physical properties suitable for a base material of the separator 20.

As described above, the non-woven fabric base material 21 includes a mixed portion 23 at the interface between the non-woven fabric base material 21 and the porous layer 22. The mixed portion 23 includes the thermoplastic fibers 24 and the cellulose fibers 25. The mixed portion 23 will be described in detail later.

Examples of the thermoplastic resin of the thermoplastic fibers 24 include styrene resins, (meth)acrylic resins, organic acid vinyl ester based resins, vinyl ether based resins, halogen-containing resins, polyolefins, polycarbonates, polyesters, polyamides, thermoplastic polyurethanes, polysulfone based resins, polyphenylene ether based resins, polyphenylene sulfide based resins, silicone resins, rubbers, and elastomers. These thermoplastic resins may be used alone or in combination. Among these, polyolefin fibers, polyester fibers, and polyvinyl alcohol fibers are preferred in terms of solvent resistance and heat resistance.

Examples of the polyolefins include homopolymers and copolymers of olefins having 2 to 6 carbon atoms, for example, polyethylene resins, such as polyethylene and ethylene-propylene copolymers, polypropylene resins, such as polypropylene, propylene-ethylene copolymers, and propylene-butene copolymers, poly(methylpentene-1), and propylene-methylpentene copolymers. Other examples of the polyolefins include ethylene-vinyl acetate copolymers, ethylene-vinyl alcohol copolymers, ethylene-(meth)acrylic acid copolymers, and ethylene-(meth)acrylate copolymers.

Examples of the polyesters include polyalkylene arylate resins, such as polyethylene terephthalate, polypropylene terephthalate, polybutylene terephthalate, and polyethylenephthalate. Examples of the acid components of the polyesters include aromatic dicarboxylic acids, such as terephthalic acid, isophthalic acid, 2,7-naphthalene dicarboxylic acid, and 2,5-naphthalene dicarboxylic acid, and alkane dicarboxylic acids, such as adipic acid, azelaic acid, and sebacic acid. Examples of the diol components of the polyesters include alkanediols, such as ethylene glycol, propylene glycol, butanediol, and neopentyl glycol, alkylene glycols, such as diethylene glycol and polyethylene glycol, and aromatic diols, such as bisphenol A.

The thermoplastic fibers 24 preferably have an average fiber diameter in the range of 5 to 25 μm, more preferably 10 to 20 μm, in terms of gas permeability (or liquid permeability) and film strength. The thermoplastic fibers 24 preferably have an average fiber length of 5 mm or more, more preferably 10 mm or more, in terms of film strength. The upper limit of the average fiber length is not particularly limited. The average fiber diameter and the average fiber length of the thermoplastic fibers 24 can be determined from electron micrographs (the same applies to the cellulose fibers 25).

The mass per unit area of the non-woven fabric base material 21 preferably ranges from 3 to 15 $g/m^2$, more preferably 5 to 10 $g/m^2$, in terms of gas permeability (or liquid permeability) and film strength. The non-woven fabric base material 21 preferably has an average pore size in the range of 0.2 to 10 μm, more preferably 0.3 to 5 μm. The average pore size can be controlled in an appropriate range by adjusting the mass per unit area and the fiber diameter and the fiber length of the thermoplastic fibers 24. The non-woven fabric base material 21 is preferably formed by controlling the mass per unit area of the non-woven fabric base material 21 in the range of 3 to 15 g/m$^2$ using the thermoplastic fibers 24 having an average fiber diameter in the range of 5 to 25 μm and an average fiber length of 5 mm or more. The resulting separator 20 can have high gas permeability and high film strength.

The non-woven fabric base material 21 (after a compression process) preferably has an average thickness in the range of 3 to 30 μm, more preferably 5 to 20 μm, still more preferably 10 to 15 μm. The non-woven fabric base material 21 before compression has a thickness in the range of 20 to 40 μm, for example. The thickness of the non-woven fabric base material 21 can be determined from electron micrographs (the same applies to the porous layer 22).

[Porous Layer 22]

The porous layer 22 is mainly composed of the cellulose fibers 25. The phrase "mainly composed of the cellulose fibers 25", as used herein, means that the amount of the cellulose fibers 25 is more than 50% by mass of the total mass of the porous layer 22. In other words, the porous layer 22 may contain organic fibers other than the cellulose fibers 25, provided that the cellulose fibers 25 constitute more than 50% by mass of the porous layer 22. Organic fibers other than the cellulose fibers 25 may be stacked on the main component, that is, the cellulose fibers 25, or may be mixed with the cellulose fibers 25.

Although the porous layer 22 may be disposed on both sides of the non-woven fabric base material 21, the porous layer 22 is preferably disposed on one side of the non-woven fabric base material 21 in order to reduce the thickness of the separator 20. As described below, the cellulose fibers 25 are preferably cellulose nanofibers having an average fiber diameter of 0.05 μm (50 nm) or less. For example, the separator 20 can be manufactured by adding the resin particles 26 to an aqueous dispersion liquid of cellulose nanofibers and applying the aqueous dispersion liquid to the non-woven fabric base material 21.

The cellulose fibers 25 are not particularly limited. Examples of the cellulose fibers 25 include natural cellulose fibers, such as softwood pulp, hardwood pulp, esparto pulp, abaca pulp, sisal pulp, and cotton pulp, and regenerated cellulose fibers, such as lyocell, which is manufactured by organic solvent spinning of these natural cellulose fibers.

The cellulose fibers 25 are preferably fibrillated cellulose fibers in terms of pore diameter control, non-aqueous electrolyte retention capability, and battery life. Fibrillation is a phenomenon of fuzzing a surface of a fiber having a fascicular structure composed of many fibrils by fraying the fiber into fibrils by the action of friction. Fibrillated fibers can be manufactured by beating fibers with a beating machine, such as a beater, a refiner, or a mill, or splitting fibers with a bead mill or an extruding kneading machine or by the action of shear force under high pressure.

The cellulose fibers 25 preferably have an average fiber diameter of 0.05 μm or less, more preferably in the range of 0.002 to 0.03 μm. The porous layer 22 preferably contains two types of cellulose fibers 25 having different average fiber diameters. For example, the porous layer 22 preferably contains cellulose fibers A having an average fiber diameter of 0.02 μm and an average fiber length of 50 μm or less and cellulose fibers B having an average fiber diameter of 0.7 μm and an average fiber length of 50 μm or less. The cellulose fibers A can form small pores having a pore diameter of 0.05 μm or less, for example. The cellulose fibers B can form pores having a pore diameter of 0.2 μm or less, for example.

The maximum pore diameter of the porous layer 22 is 0.2 μm or less. In the pore size distribution of the porous layer 22, pores having a pore diameter of 0.05 μm or less preferably account for 50% or more of the total pore volume. Overcharge or repeated charge/discharge may form a lithium dendrite on the surface of the negative electrode 12. The lithium dendrite may grow gradually toward the positive electrode 11 through a shortest path, penetrate the separator, and reach the positive electrode 11, thereby causing an internal short circuit. As in the separator 20, however, in the case where the cellulose fibers 25 have a fascicular structure, and the porous layer 22 has a maximum pore diameter of 0.2 μm or less, and pores having a pore diameter of 0.05 μm or less account for 50% or more of the total pore volume, the occurrence of an internal short circuit can be decreased because of high mechanical strength, denseness, and tortuosity of the separator.

The term "tortuosity", as used herein, refers to the shape of a pore channel extending from one side to the opposite side of a porous film. Low tortuosity indicates the presence of many vertical through-holes in the porous film and may be responsible for an internal short circuit caused by a lithium dendrite. The porous layer 22 has a higher-order structure composed of fibrillated fibers having an average fiber diameter of 0.05 μm or less and an average fiber length of 50 μm or less and is a dense porous film having high tortuosity. In order to ensure high mechanical strength of the porous layer 22 and suppress the decrease in output of a non-aqueous electrolyte secondary battery, the porous layer 22 preferably has a maximum pore diameter in the range of 0.1 to 0.2 μm. Pores having a pore diameter of 0.05 μm or less preferably account for 50% to 80% of the total pore volume.

In the case where the porous layer 22 has a maximum pore diameter of more than 0.2 μm, the porous layer 22 has lower mechanical strength, denseness, and tortuosity than the porous layer 22 having a maximum pore diameter of 0.2 μm or less. This results in a higher occurrence of an internal short circuit caused by a lithium dendrite. A maximum pore diameter of less than 0.1 μm may result in reduced input and output. In the case where pores having a pore diameter of more than 0.05 μm account for more than 50% of the total pore volume (pores having a pore diameter of 0.05 μm or less account for less than 50% of the total pore volume), the porous layer 22 has lower mechanical strength, denseness, and tortuosity than the case where pores having a pore diameter of 0.05 μm or less account for 50% or more of the total pore volume. This results in a higher occurrence of an internal short circuit caused by a lithium dendrite. In the case where pores having a pore diameter of more than 0.05 μm account for less than 20% of the total pore volume, this results in reduced input and output.

The pore size distribution of the porous layer 22 can be determined with a Perm-Porometer, which can perform pore size measurements using a bubble point method (JIS K 3832, ASTM F316-86). For example, the pore size distribution can be determined with a Perm-Porometer CFP-1500AE manufactured by Seika Corp. A solvent having low surface tension, such as SILWICK (20 dyne/cm) or GAK-WICK (16 dyne/cm), is used as a test solution. Dry air is pressurized to a measuring pressure of 3.5 MPa. Pores having a pore diameter of 0.01 μm or more can be measured.

The pore size distribution can be determined from the amount of air passing through at the measuring pressure.

The maximum pore diameter of the porous layer 22 is the maximum pore diameter in the pore size distribution measured as described above. The percentage of pores having a pore diameter of 0.05 μm or less based on the total pore volume can be calculated from the ratio (B/A) of the peak area (B) corresponding to the pores having a pore diameter of 0.05 μm or less to the total peak area (A) in the pore size distribution.

In the pore size distribution of the porous layer 22 measured with a Perm-Porometer, the pore diameters preferably have a wide distribution in the range of 0.01 to 0.2 μm, and there is preferably at least one peak at a pore diameter in the range of 0.01 to 0.2 μm.

The total mass per unit area of the cellulose fibers 25 in the porous layer 22 and the mixed portion 23 is preferably more than 5 g/m$^2$ and 20 g/m$^2$ or less, more preferably 8 to 17 g/m$^2$, still more preferably 10 to 15 g/m$^2$, in order to prevent an internal short circuit caused by a lithium dendrite. When the mass per unit area is in these ranges, the porous layer 22 and the mixed portion 23 can have a sufficient thickness while maintaining high gas permeability and prevent an internal short circuit. A dense microporous film in which the cellulose fibers 25 strongly combine with each other by hydrogen bonding is formed on a surface of the separator 20 on which the porous layer 22 is formed while the thermoplastic fibers 24 of the non-woven fabric base material 21 are not exposed.

The porous layer 22 preferably has a thickness in the range of 5 to 30 μm in total in order to ensure high mechanical strength of the porous layer 22 and improve the charge/discharge performance of the non-aqueous electrolyte secondary battery 10. In the case where the porous layer 22 has a thickness of 5 μm or more, the porous layer 22 has higher mechanical strength, a smaller number of vertical through-holes, and a lower occurrence of an internal short circuit caused by a lithium dendrite than the case where the porous layer 22 has a thickness of less than 5 μm. The porous layer 22 having a thickness of 30 μm or less can retard deterioration in charge/discharge performance as compared with the porous layer 22 having a thickness of more than 30 μm.

The porous layer 22 may have any porosity and preferably has a porosity in the range of 30% to 70% in terms of charge/discharge performance. Porosity is the percentage of the volume of the porous film that consists of pore space. The porous layer 22 may have any gas permeability and preferably has a gas permeability in the range of 150 to 800 s/100 cc in terms of charge/discharge performance. Gas permeability is determined by measuring the time it takes for 100 cc of air to vertically pass through a porous film at a constant pressure.

As described above, the porous layer 22 includes the particle mixed portion 27 in which the cellulose fibers 25 and the resin particles 26 coexist. The resin particles 26 provide the separator 20 with a shutdown function of blocking the pores of the porous layer 22 and preventing penetration of lithium ions in the event of abnormal heat generation in the battery. In the porous layer 22, for example, the resin particles 26 are localized at one surface of the porous layer and the vicinity thereof and are not uniformly dispersed. Because of the localization of the resin particles 26, satisfactory shutdown characteristics can be achieved with a small amount of resin.

The resin particles 26 preferably melt at a temperature in the range of 90° C. to 200° C. in terms of shutdown characteristics. The initial melting temperature of the resin particles 26 is more preferably ranges from 100° C. to 170° C., still more preferably 110° C. to 150° C. The resin particles 26 may have any composition and may be formed of an olefin resin, an acrylic resin, a styrene resin, or a urethane resin. The volumetric average particle diameter of the resin particles 26 depends partly on the pore diameter of the porous layer 22 and preferably ranges from 0.1 to 10 μm, more preferably 0.5 to 5 μm (for example, approximately 1 μm). The volumetric average particle diameter can be determined from electron microscopic observation or three-dimensional electron microscopic observation of a cross section of the porous layer 22.

The ratio of the amount of the resin particles 26 to the total amount of the cellulose fibers 25 and the resin particles 26 in the porous layer 22 preferably increases with decreasing distance from a surface of the porous layer 22 opposite the non-woven fabric base material 21 (hereinafter referred to as a "first surface"; a surface of the porous layer 22 disposed on the side of the non-woven fabric base material 21 is hereinafter referred to as a "second surface"). Although the resin particles 26 may be dispersed throughout the porous layer 22, and the entire porous layer 22 may be the particle mixed portion 27, the particle mixed portion 27 is preferably disposed between the center of the porous layer 22 in the thickness direction and the first surface. In other words, preferably, substantially no resin particle 26 is disposed between the center of the porous layer 22 in the thickness direction and the second surface (the resin particle occupied area described below is less than 5%).

In a vertical cross section of the first surface, more specifically at a depth of 1 μm or less from the first surface, of the porous layer 22, the occupied area of the resin particles 26 (hereinafter referred to as a "first occupied area $_{26}$") is preferably 90% or more of the total occupied area of the cellulose fibers 25 and the resin particles 26. The term "depth", as used herein, refers to the length in the thickness direction of the porous layer 22. In the case where a particle layer, for example, formed of $SiO_2$ or $Al_2O_3$ is formed on the porous layer 22, the interface between the particle layer and the porous layer 22 is the first surface. The first occupied area $_{26}$ can be determined from electron microscopic observation or three-dimensional electron microscopic observation of a cross section of the porous layer 22. The first occupied area $_{26}$ is more preferably 95% or more (for example, approximately 100%). Preferably, the first surface of the porous layer 22 is covered with the resin particles 26, and substantially no cellulose fiber 25 is exposed on the first surface side.

In a vertical cross section of the porous layer 22 at a depth in the range of 2 to 5 μm from the first surface (hereinafter referred to as a "near-surface region"), the occupied area of the resin particles 26 (hereinafter referred to as a "second occupied area $_{26}$") preferably ranges from 30% to 50% of the total occupied area of the cellulose fibers 25 and the resin particles 26. In the same manner as in the first occupied area $_{26}$, the second occupied area $_{26}$ can be determined from electron microscopic observation or three-dimensional electron microscopic observation of a cross section of the porous layer 22.

Thus, although the particle density is highest on the first surface in the porous layer 22, the resin particles 26 are distributed not only on the outermost surface but also to a certain depth. Since the first resin particles 26 attract each other by the action of interparticle cohesive force, the resin particles 26 combine with each other not only on the first surface but also in the thickness direction. Although a particle layer formed only on a surface of the porous layer 22 detaches easily from the porous layer 22, the layer of the resin particles 26 disposed on the first surface rarely detaches from the porous layer 22.

The second occupied area $_{26}$ in the near-surface region of the porous layer 22 preferably decreases with the distance from the first surface. Such a distribution of the resin particles 26 can provide satisfactory shutdown characteristics without reducing the film strength and gas permeability.

[Mixed Portion 23]

The mixed portion 23 includes the thermoplastic fibers 24 and the cellulose fibers 25 and is disposed at the interface between the non-woven fabric base material 21 and the porous layer 22. More specifically, the mixed portion 23 has a predetermined thickness on the surface of the non-woven fabric base material 21. In the mixed portion 23, the cellulose fibers 25 adhere to the thermoplastic fibers 24, and spaces between the thermoplastic fibers 24 are filled with the cellulose fibers 25. In the separator 20, the mixed portion 23 strongly combines the thermoplastic fibers 24 and the cellulose fibers 25 and thereby increases the interfacial strength between the non-woven fabric base material 21 and the porous layer 22.

The mixed portion 23 preferably has a thickness of 1 μm or more from a surface of the non-woven fabric base material 21. The phrase "a surface of the non-woven fabric base material 21", as used herein, refers to a surface along a virtual plane on the non-woven fabric base material 21. The mixed portion 23 may be formed when an aqueous dispersion liquid of the cellulose fibers 25 is applied to the non-woven fabric base material 21 and forms the porous layer 22, and the aqueous dispersion liquid permeates the non-woven fabric base material 21. Thus, the cellulose fibers 25 are disposed 1 μm or more inside the non-woven fabric surface and form the mixed portion 23. The thickness of the mixed portion 23 can be controlled via the coated amount of the aqueous dispersion liquid, that is, the total mass per unit area of the cellulose fibers 25 in the porous layer 22 and the mixed portion 23.

The mixed portion 23 is preferably completely covered with the porous layer 22. In other words, the thermoplastic fibers 24 in the mixed portion 23 are preferably not exposed on the surface of the separator 20 on which the porous layer 22 is formed. Thus, a dense microporous film in which the cellulose fibers 25 strongly combine with each other by hydrogen bonding is formed on the surface of the separator 20 and thereby prevents the formation of large pores resulting from interface separation between the cellulose fibers and the thermoplastic fibers, for example.

[Method for Manufacturing Separator 20]

As described above, the separator 20 can be manufactured by dispersing the cellulose fibers 25 and the resin particles 26 in an aqueous solvent, applying the resulting aqueous dispersion liquid to one surface of the non-woven fabric base material 21, and drying the aqueous dispersion liquid. Through the application and drying of the aqueous dispersion liquid, spherical resin particles 26 having a lower specific gravity than the cellulose fibers 25 and free of entanglements are localized on the first surface side. As a result, the occupied area of the resin particles 26 on the first surface is 90% or more, the resin particles 26 in the porous layer 22 are smaller in amount than the cellulose fibers 25, and the separator 20 has a microporous structure resulting from entanglement of the cellulose fibers 25. The separator 20 includes the mixed portion 23 in which the thermoplastic fibers 24 and the cellulose fibers 25 coexist. After the aqueous dispersion liquid of the cellulose fibers 25 is applied to the non-woven fabric base material 21, the aqueous dispersion liquid containing the resin particles 26 may be applied to realize the distribution of the resin particles 26 described above.

The aqueous solvent may contain a surfactant and a thickener and may have controlled viscosity and dispersion state. The aqueous dispersion liquid may contain an organic solvent in order to form pores of the porous film. The organic solvent may be selected from those having high compatibility with water, for example, glycols, such as ethylene glycol, glycol ethers, glycol diethers, N-methylpyrrolidone, and other polar solvents. An aqueous binder, such as CMC or PVA, or an emulsion binder, such as SBR, may be used to control slurry viscosity and strengthen the porous film. The distribution of the resin particles 26 can depend on the slurry viscosity. The slurry may contain long resin fibers that do not affect the slurry coating performance, and the resin fibers may be melted by heat calender press to form a porous film.

EXAMPLES

Although the present disclosure will be further described in the following examples, the present disclosure is not limited to these examples.

Example 1

Selection of Non-Woven Fabric Base Material

A non-woven fabric A was selected as a non-woven fabric base material. The non-woven fabric A was formed of polypropylene fibers and polyethylene fibers, had a mass per unit area of 10 g/m$^2$, had an average fiber diameter of 12 μm, and was manufactured by a spunbond process.

[Preparation of Cellulose Nano-Fiber Slurry]

A hundred parts by mass of cellulose fibers having a fiber diameter of 0.5 μm or less (average fiber diameter of 0.02 μm) and a fiber length of 50 μm or less, 0.2 parts by mass of a thickener PVA, and 25 parts by mass of polyethylene resin particles having a volumetric average particle diameter of 1 μm were dispersed in 100 parts by mass of water. Five parts by mass of an ethylene glycol solution was then added to the dispersion liquid. The viscosity of the dispersion liquid was then adjusted with water. Thus, an aqueous dispersion liquid (cellulose nano-fiber slurry B1) having a viscosity of 3000 mPa·s was prepared.

[Preparation of Separator]

A multilayer film was prepared by applying the cellulose nano-fiber slurry B1 to one surface of the non-woven fabric A at a mass per unit area of 10 g/m$^2$ and drying the cellulose nano-fiber slurry B1 in hot air at 100° C., thus forming a porous layer mainly composed of cellulose fibers on one surface of the non-woven fabric A. The multilayer film was compressed with a calender roll at normal temperature to form a separator C1 having a thickness of 20 μm. Table 1 shows the physical properties of the separator C1.

Example 2

An aqueous dispersion liquid (cellulose nano-fiber slurry B2) having a viscosity of 10000 mPa·s was prepared in the same manner as in Example 1 except that 1 part by mass of the PVA was added. The slurry B2 was used to prepare a separator C2. Table 1 shows the physical properties of the separator C2.

Example 3

An aqueous dispersion liquid (cellulose nano-fiber slurry B3) having a viscosity of 3000 mPa·s was prepared in the same manner as in Example 1 except that 75 parts by mass of the polyethylene resin particles were added. The slurry B3 was used to prepare a separator C3. Table 1 shows the physical properties of the separator C3.

Example 4

An aqueous dispersion liquid (cellulose nano-fiber slurry B4) having a viscosity of 10000 mPa·s was prepared in the same manner as in Example 3 except that 1 part by mass of the PVA was added. The slurry B4 was used to prepare a separator C4. Table 1 shows the physical properties of the separator C4.

Comparative Example 1

An aqueous dispersion liquid having a viscosity of 3000 mPa·s was prepared in the same manner as in Example 1 except that the polyethylene resin particles were not added. The aqueous dispersion liquid was used to prepare a separator X1. Table 1 shows the physical properties of the separator X1.

Comparative Example 2

An aqueous dispersion liquid having a viscosity of 20000 mPa·s was prepared in the same manner as in Example 1 except that 10 parts by mass of the polyethylene resin particles and 0.2 parts by mass of the thickener PVA were added. The aqueous dispersion liquid was used to prepare a separator X2. Table 1 shows the physical properties of the separator X2.

Comparative Example 3

An aqueous dispersion liquid having a viscosity of 3000 mPa·s was prepared in the same manner as in Example 1 except that 25 parts by mass of the polyethylene resin particles and no thickener were added. The aqueous dispersion liquid was used to prepare a separator X3. Table 1 shows the physical properties of the separator X3.

The separators C1 to C4 and X1 to X3 were evaluated as described below.

[Measurement of Gas Permeability]

Gas permeability was determined in accordance with JIS P 8117 Paper and board—Determination of air permeance and air resistance—Gurley method. Air permeance was the time (seconds) it takes for 100 cc of air to pass through a porous film. Gas permeability was evaluated using unheated samples (initial state) and samples heated at 140° C. for 10 minutes.

[Measurement of Average Pore Size]

The average pore size was measured with a Perm-Porometer. The data thus obtained are independent of the non-woven fabric base material and represent the average pore sizes of porous layers.

[Measurement of Occupied Area]

The ratios of the occupied area of resin particles to the total occupied area of cellulose fibers and the resin particles in a vertical cross section at a depth of 1 μm or less from a surface (first surface) of the porous layer opposite the non-woven fabric base material and a vertical cross section at a depth in the range of 2 to 5 μm (near-surface region) from the first surface were determined from electron microscopic observation of the cross sections of the porous layer. The former is hereinafter referred to as a first occupied area, and the latter is hereinafter referred to as a second occupied area.

Table 1 shows the evaluation results for the separators C1 to C4 and X1 to X3.

TABLE 1

| | Gas permeability (s/100 cc) | | Average pore size | Second occupied area | First occupied area |
|---|---|---|---|---|---|
| | Initial | After heating | | | |
| C1 | 440 | 10000 | 0.03 μm | 30% | 100% |
| C2 | 400 | 8000 | 0.05 μm | 50% | 90% |
| C3 | 320 | 20000 | 0.10 μm | 50% | 100% |
| C4 | 300 | 20000 | 0.20 μm | 60% | 100% |
| X1 | 450 | 450 | 0.03 μm | — | — |
| X2 | 380 | 600 | 0.10 μm | 10% | 5% |
| X3 | 410 | — | 0.03 μm | 0% | 100% |

The electron microscopic observation showed that in the separators C1 to C4 according to the examples, the ratio of the amount of the resin particles to the total amount of the cellulose fibers and the resin particles increased with decreasing distance from the first surface of the porous layer (see the first and second occupied areas in Table 1). The gas permeability of the separators C1 to C4 was significantly increased by heating at 140° C. Thus, the separators C1 to C4 in the normal operation state have high gas permeability and reliably perform a shutdown function in the event of abnormal heat generation.

The separator X1 according to Comparative Example 1 had no change in gas permeability resulting from heating and did not perform the shutdown function. The separator X2 had a slight increase in gas permeability due to heating but performed a shutdown function unsatisfactorily. In the separator X3, the resin particles and the cellulose fibers on the surface independently shrank during the application and drying. Because of a difference in shrinkage, the surface resin layer lifted, and was completely detached from the separator X3 in a calender press or slit process. Thus, the gas permeability of the separator X3 could not be measured.

Because of a smaller amount of resin particles in the separators C1 and C2, the ratio of the resin particles in the near-surface region (second occupied area) was smaller in the separators C1 and C2 than in the separators C3 and C4, and gas permeability after heating was also lower in the separators C1 and C2 than in the separators C3 and C4. However, a large amount of resin particles as in the separators C3 and C4 results in a large average pore size.

[Battery Test]

Laminated batteries were manufactured using the separators C1 to C4. Lithium cobalt oxide was used as a positive electrode. Carbon was used as a negative electrode. A non-aqueous electrolytic solution was used as a non-aqueous electrolyte in which 1.0 mol/L of an electrolyte salt $LiPF_6$ was dissolved in a non-aqueous solvent containing ethylene carbonate (EC), ethyl methyl carbonate (EMC), and dimethyl carbonate (DMC) at a volume ratio of 3:3:4. After a laminated battery in a 50% charged state was heated to 140° C., charging was started. The voltage reached the upper limit, and charging was terminated. This results show that the separator performed shutdown.

What is claimed is:

1. A separator for a non-aqueous electrolyte secondary battery, comprising a porous layer that contains cellulose fibers and resin particles, wherein:
the porous layer has a first outer surface and a second outer surface opposite to the first outer surface, and
a ratio of an amount of the resin particles to a total amount of the cellulose fibers and the resin particles increases from the second outer surface to the first outer surface.

2. The separator for a non-aqueous electrolyte secondary battery according to claim 1, wherein
a ratio of an occupied area of the resin particles to a total occupied area of the cellulose fibers and the resin particles in a vertical cross section of the porous layer at a depth of 1 μm or less from the first outer surface is 90% or more.

3. The separator for a non-aqueous electrolyte secondary battery according to claim 2, wherein
the ratio of the occupied area of the resin particles to the total occupied area of the cellulose fibers and the resin particles in the vertical cross section of the porous layer at a depth in a range of 2 to 5 μm from the first outer surface ranges from 30% to 50%.

4. The separator for a non-aqueous electrolyte secondary battery according to claim 1, wherein
a melting temperature of the resin particles is in a range of 90° C. to 200° C.

5. The separator for a non-aqueous electrolyte secondary battery according to claim 1, further comprising:
a non-woven fabric base material containing thermoplastic fibers,
wherein the second outer surface of the porous layer is attached to the non-woven fabric base material.

6. The separator for a non-aqueous electrolyte secondary battery according to claim 5, wherein
the separator includes a mixed portion of the thermoplastic fibers and the cellulose fibers at an interface between the non-woven fabric base material and the porous layer.

7. The separator for a non-aqueous electrolyte secondary battery according to claim 1, wherein
the cellulose fibers have an average fiber diameter of 0.05 μm or less.

8. The separator for a non-aqueous electrolyte secondary battery according to claim 1, wherein
the porous layer has a maximum pore diameter of 0.2 μm or less as measured with a Perm-Porometer.

9. A non-aqueous electrolyte secondary battery, comprising:
a positive electrode;
a negative electrode;
the separator for a non-aqueous electrolyte secondary battery according to claim 1 disposed between the positive electrode and the negative electrode; and
a non-aqueous electrolyte.

10. The separator for a non-aqueous electrolyte secondary battery according to claim 1,
wherein the resin particles are made of at least one of an olefin resin, an acrylic resin, a styrene resin, or a urethane resin.

11. The separator for a non-aqueous electrolyte secondary battery according to claim 1, further comprising a particle layer formed on the first outer surface of the porous layer, the particle layer including at least one of as iron oxide particles, silica particles, alumina particles and $TiO_2$ particles.

12. The separator for a non-aqueous electrolyte secondary battery according to claim 1,
wherein no cellulose fibers appear on the first outer surface of the porous layer.

13. The separator for a non-aqueous electrolyte secondary battery according to claim 1,
wherein no resin particles appear on the second outer surface of the porous layer.

14. A separator for a non-aqueous electrolyte secondary battery, comprising a porous layer that contains cellulose fibers and resin particles, wherein:
the porous layer has a first outer surface and a second outer surface opposite to the first outer surface, and
a density of the resin particles in the porous layer increases from the second outer surface to the first outer surface.

15. The separator for a non-aqueous electrolyte secondary battery according to claim 14, wherein
a ratio of an occupied area of the resin particles to a total occupied area of the cellulose fibers and the resin particles in a vertical cross section of the porous layer at a depth of 1 μm or less from the first outer surface is 90% or more.

16. The separator for a non-aqueous electrolyte secondary battery according to claim 15, wherein
the ratio of the occupied area of the resin particles to the total occupied area of the cellulose fibers and the resin particles in the vertical cross section of the porous layer at a depth in a range of 2 to 5 μm from the first outer surface ranges from 30% to 50%.

17. The separator for a non-aqueous electrolyte secondary battery according to claim 14, wherein
a melting temperature of the resin particles is in a range of 90° C. to 200° C.

18. A separator for a non-aqueous electrolyte secondary battery, comprising:
a base layer; and
a porous layer disposed on the base layer and having a first outer surface and a second outer surface opposite to the first outer surface, the second outer surface being attached to the base layer, wherein:
the porous layer contains cellulose fibers and resin particles, and
a density of the resin particles in a region closer to the first outer surface is higher than a density of the resin particles in a region closer to the second outer surface.

19. The separator for a non-aqueous electrolyte secondary battery according to claim 18, wherein the base layer is a non-woven fabric material containing thermoplastic fibers.

20. The separator for a non-aqueous electrolyte secondary battery according to claim 19, wherein the separator includes a mixed portion of the thermoplastic fibers and the cellulose fibers at an interface between the non-woven fabric base material and the porous layer.

* * * * *